United States Patent [19]

Hataoka et al.

[11] Patent Number: 4,811,231
[45] Date of Patent: Mar. 7, 1989

[54] APPARATUS FOR CONTROLLING FUEL INJECTION AND SWIRL MOTION OF AIR IN INTERNAL COMBUSTION ENGINE

[75] Inventors: Kenji Hataoka; Akinori Yamashita; Masanori Misumi; Noboru Hashimoto, all of Hiroshima, Japan

[73] Assignee: Mazda Motor Corporation, Tokyo, Japan

[21] Appl. No.: 111,133

[22] Filed: Oct. 19, 1987

Related U.S. Application Data

[63] Continuation of Ser. No. 724,684, Apr. 19, 1985, abandoned.

[30] Foreign Application Priority Data

Apr. 27, 1984 [JP] Japan .................................. 59-85727

[51] Int. Cl.⁴ .............................................. F02B 19/08
[52] U.S. Cl. .......................... 364/431.05; 123/188 M; 123/308
[58] Field of Search ............... 123/476, 478, 492, 463, 123/203, 251, 252, 188 M, 491, 508; 364/431.05

[56] References Cited

U.S. PATENT DOCUMENTS

| | | | |
|---|---|---|---|
| 3,742,919 | 7/1973 | Suda | 123/478 |
| 3,782,338 | 1/1974 | Hayashi et al. | 123/478 |
| 4,275,694 | 6/1981 | Nagaichi | 123/463 |
| 4,327,691 | 5/1982 | Moser | 123/478 |
| 4,423,485 | 12/1983 | Sami et al. | 364/431.05 |
| 4,493,305 | 1/1985 | Takimoto et al. | 123/476 |
| 4,501,249 | 2/1985 | Amano et al. | 123/478 |
| 4,543,931 | 10/1985 | Hitomi et al. | 123/308 |
| 4,545,347 | 10/1985 | Morikawa | 123/308 |
| 4,557,238 | 12/1985 | Kuehnl | 123/478 |
| 4,562,817 | 1/1986 | Ito | 123/478 |

FOREIGN PATENT DOCUMENTS 0044537 1/1982 European Pat. Off. ............ 123/476

Primary Examiner—Parshotam S. Lall
Assistant Examiner—Ngoc Pham
Attorney, Agent, or Firm—Gerald J. Ferguson, Jr.

[57] ABSTRACT

An internal combustion engine is provided with a fuel injection valve in an intake passage communicated with a combustion chamber and a swirl controlling device for controlling a swirling motion to be given to intake air in a circumferential direction of the cylinder forming the combustion chamber. When the engine load is low, the fuel injection valve is controlled to inject fuel by an amount required for one power stroke a predetermined time after the intake valve is opened and during the intake stroke, and the swirl controlling device is controlled to give intake air a swirling motion. A correction device is provided, which, when the engine is cold, controls the fuel injection valve to start fuel injection before the intake valve is opened and also controls the swirl controlling device to suppress production of swirling motion of intake air.

11 Claims, 7 Drawing Sheets

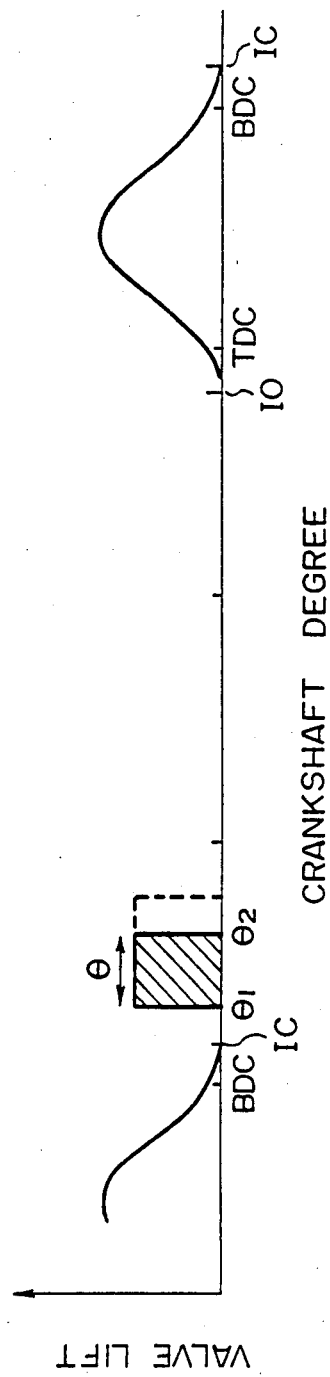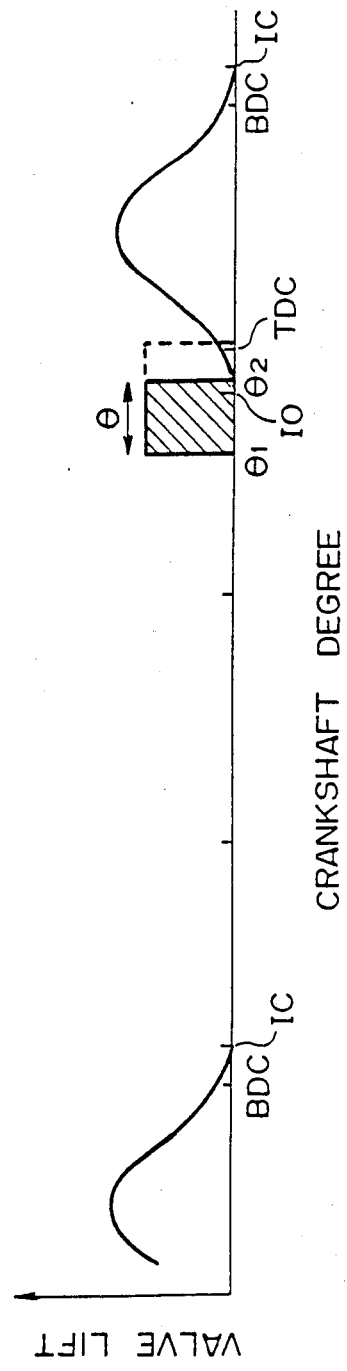

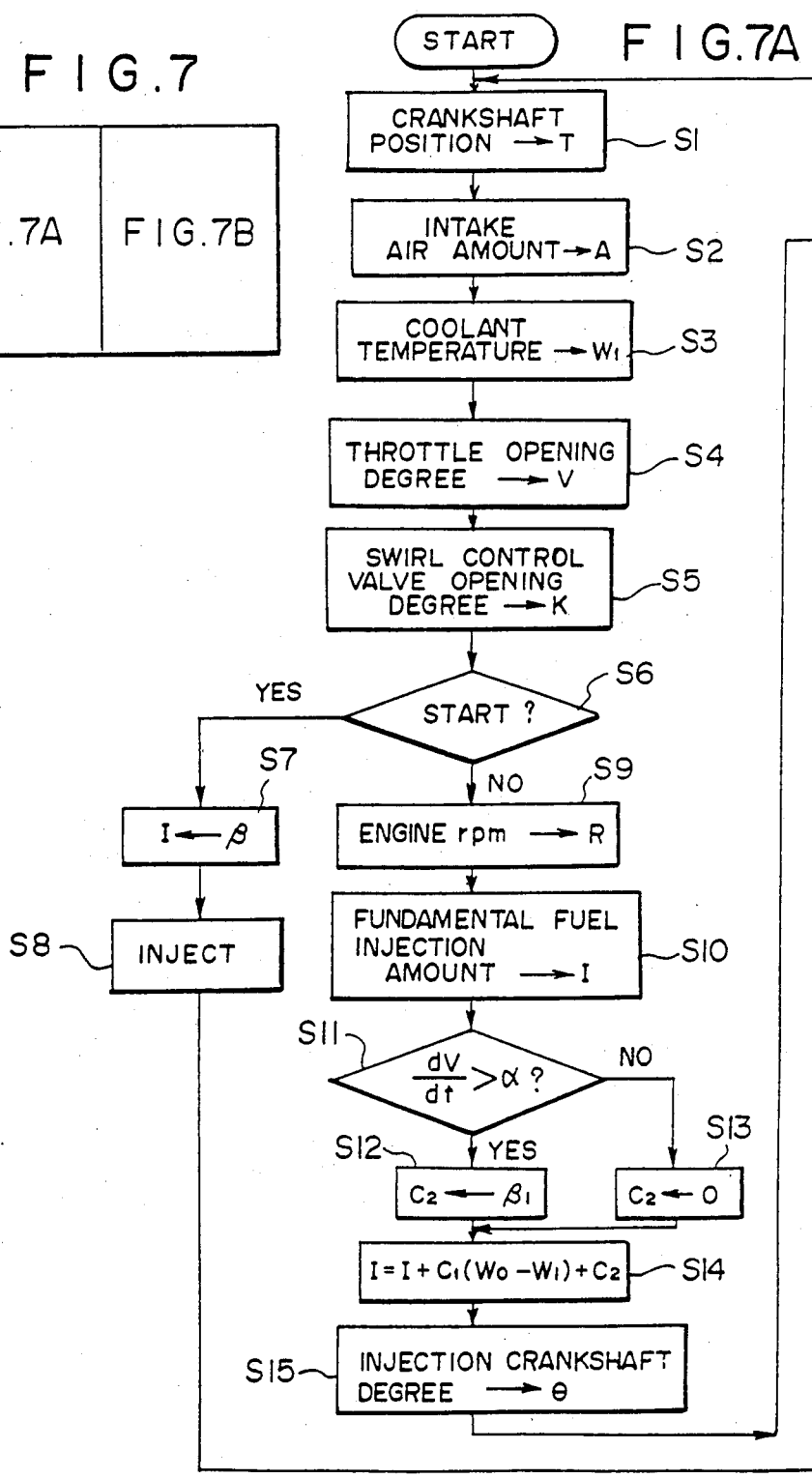

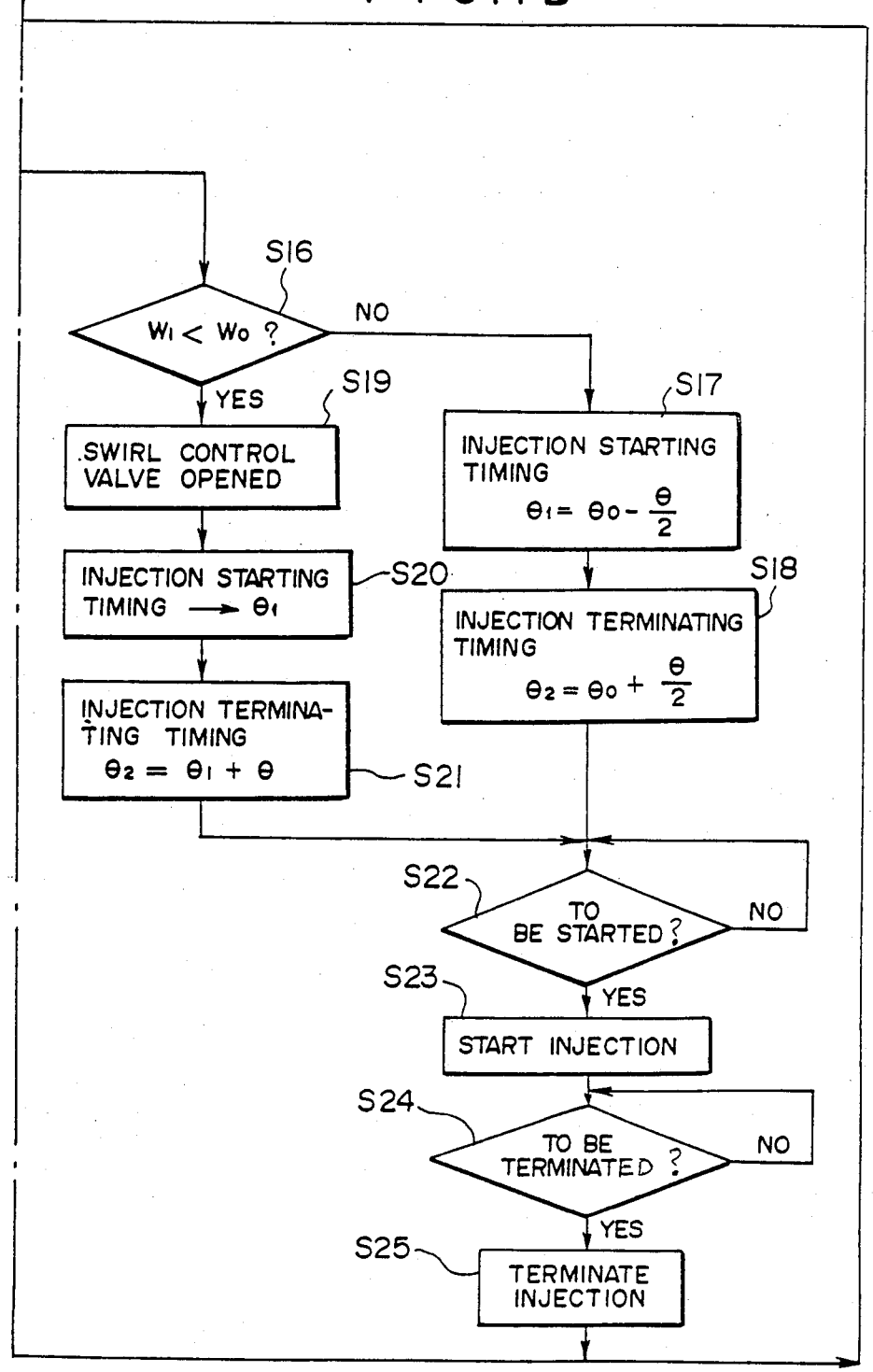

APPARATUS FOR CONTROLLING FUEL INJECTION AND SWIRL MOTION OF AIR IN INTERNAL COMBUSTION ENGINE

This application is a continuation of Ser. No. 724,684, filed 4/19/85, now abandoned.

BACKGROUND OF THE INVENTION

1. Field of the Invention

This invention relates to an internal combustion engine, and more particularly to an internal combustion engine having a fuel injection device by which so-called stratified charge is accomplished at least during light load operation of the engine.

2. Description of the Prior Art

There has been known a stratified charge technique in which a fuel injection valve is provided in an intake passage and fuel is injected in the latter half of the intake stroke during light load operation of the engine so that rich air-fuel mixture surrounds the spark plug and lean air-fuel mixture surrounds the rich mixture, and so that the air-fuel mixture is given a swirling motion as it enters the combustion chamber, thereby suppressing diffusion of the stratified fuel in the compression stroke. See Japanese Unexamined Patent Publication Nos. 56(1981)-148636 and British Pat. No. 2,108,581, for example.

In the stratified charge, the mixture near the spark plug must be rich enough to be ignited by the spark plug, but the mixture remote from the spark plug may be very lean. Thus the stratified charge is advantageous in that the overall air-fuel ratio may be lean and accordingly the fuel economy can be improved and exhaust emissions can be reduced. Further, in the stratified charge, the mixture in the end gas zone is lean and hard to ignite and accordingly spark knock can be prevented.

On the other hand, the stratified charge involves a problem that, since the fuel is directly introduced into the combustion chamber before the fuel is sufficiently vaporized and atomized, the ignitability of the air-fuel mixture and the stability in combustion are adversely affected, especially when the engine is cold.

SUMMARY OF THE INVENTION

In view of the foregoing observations and description, the primary object of the present invention is to provide an internal combustion engine having a fuel injection device in which vaporization and atomization of fuel are promoted when the engine is cold and reversed stratification is prevented.

In accordance with the present invention, there is provided a fuel-injected internal combustion engine comprising a fuel injection valve disposed in an intake passage communicated with a combustion chamber by way of an intake valve, a swirl controlling device for controlling a swirling motion to be given to intake air in the circumferential direction of the cylinder forming the combustion chamber, a control device which, at least at low load, controls the fuel injection valve to inject fuel by an amount required for one power stroke a predetermined time after the intake valve is opened and during the intake stroke and controls the swirl controlling device to give intake air a swirling motion, and a correction means which, when the engine is cold, controls the fuel injection valve to start fuel injection before the intake valve is opened and controls the swirl controlling device to suppress production of swirling motion of intake air.

In the internal combustion engine of the present invention, the stratified charge is accomplished when the engine load is low, thereby improving the fuel economy and reducing exhaust emissions.

When the engine is cold, fuel is injected before the intake valve is opened to be brought into contact with the wall of the intake passage, the intake valve and the like so that vaporization and atomization of the fuel are promoted, thereby improving the ignitability and the stability in combustion. When a strong swirling motion is given to intake air flowing into the combustion chamber in the case that the fuel is injected before opening of the intake valve, there is a possibility that fuel introduced into the combustion chamber relatively early will be accumulated in the lower portion of the combustion chamber to form a reversed stratification. However, in accordance with the present invention, this problem is avoided by suppressing the production of the swirling motion of intake air when the engine is cold.

BRIEF DESCRIPTION OF THE DRAWINGS

FIG. 6A is a timing chart for illustrating an example of the fuel injection timing when the engine is cold, FIG. 6B is a timing chart for illustrating another example of the fuel injection timing when the engine is cold, FIGS. 7, 7A and 7B a flow chart for illustrating the operation of the control device.

DESCRIPTION OF THE PREFERRED EMBODIMENT

Figure 1:
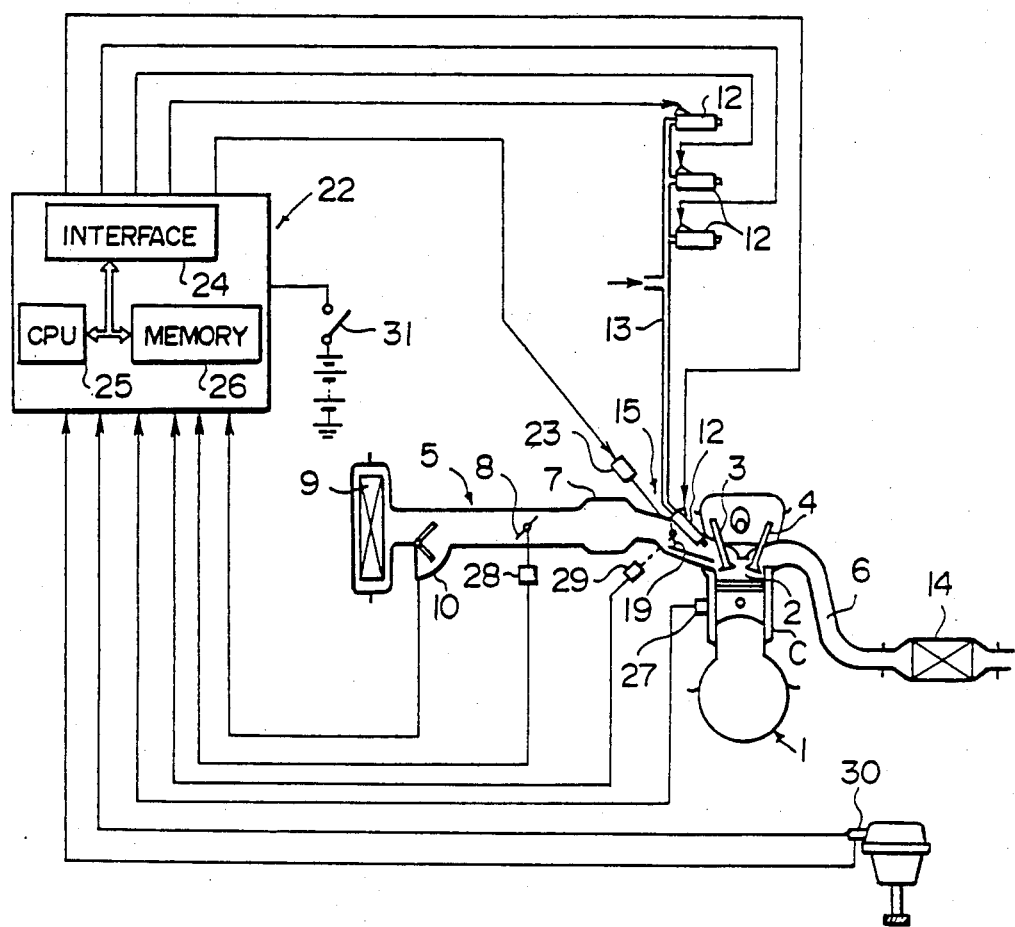
FIG. 1 is a schematic view for illustrating a fuel-injected internal combustion engine in accordance with an embodiment of the present invention.

In FIG. 1, an internal combustion engine 1 in accordance with an embodiment of the present invention has first to fourth cylinders C (only one of them is shown in FIG. 1). To a combustion chamber 2 formed in each cylinder C, are connected an intake passage 5 and an exhaust passage 6 respectively by way of an intake valve 3 and an exhaust valve 4. The intake passage 5 is provided with a surge tank 7, a throttle valve 8 disposed upstream of the surge tank 7, an air cleaner 9 connected to the upstream end of the intake passage 5, and an airflow meter 10 disposed between the throttle valve 8 and the air cleaner 9 to detect flow of intake air. In the downstream portion of the intake passage 5 is provided a fuel injection valve 12 directed to the intake valve 3. The fuel injection valve 12 is connected to a fuel supply line 13 which is connected to a fuel reservoir (not shown) by way of a fuel pressure regulator (not shown). To the fuel injection valve 12 is imparted a fuel pressure which is controlled by the fuel pressure regulator so that the pressure difference between the fuel pressure and the pressure in the intake passage is kept constant.

The exhaust passage 6 is provided with a catalytic converter 14.

The intake passage 5 is arranged to give the mixture introduced into the combustion chamber a swirling motion in the circumferential direction of the cylinder C forming the combustion chamber 2. Further, the intake passage 5 is provided with a swirl controlling device 15 for controlling the swirling motion to be given to the mixture.

Figure 2:
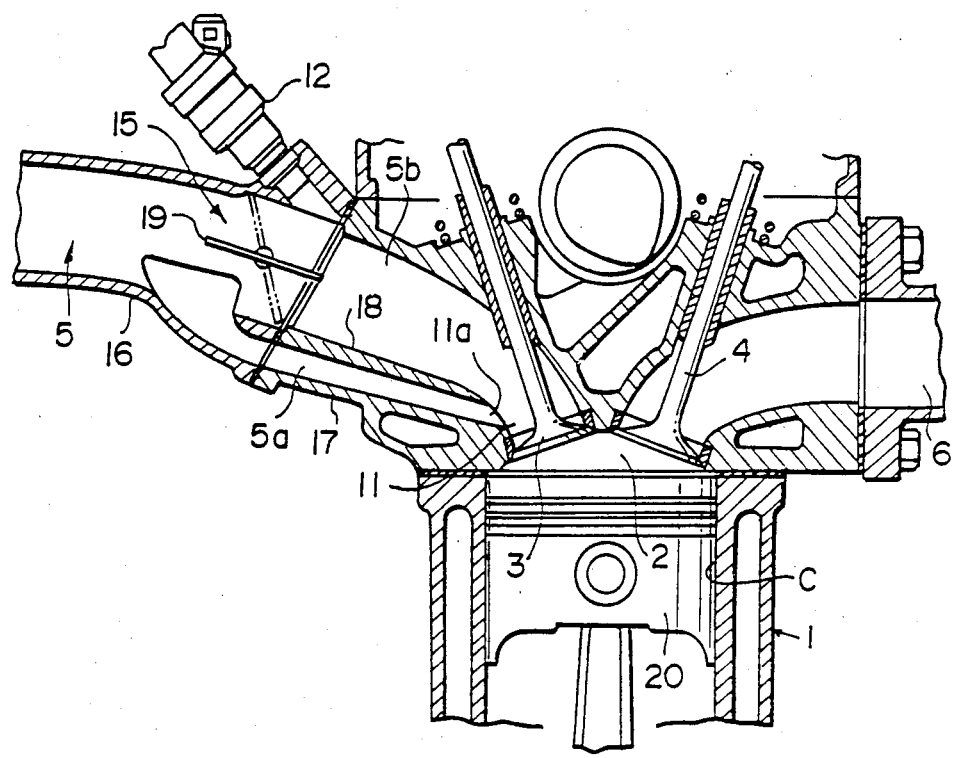
FIG. 2 is an enlarged fragmentary cross-sectional view of the engine shown in FIG. 1.
Figure 3:
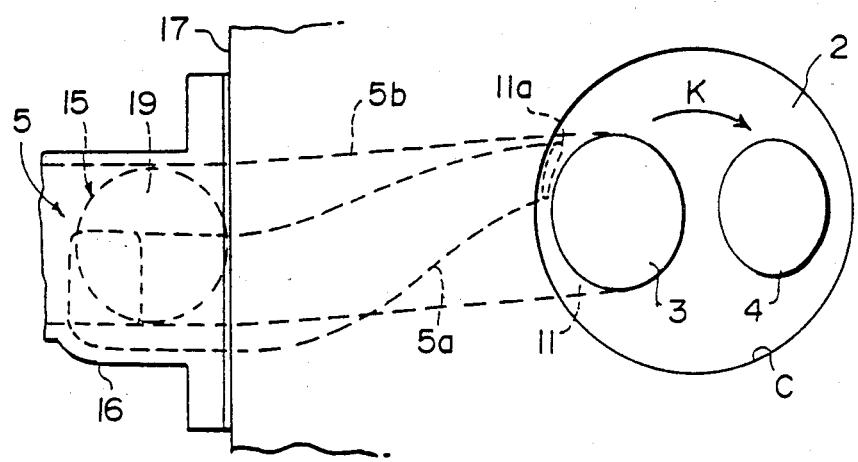
FIG. 3 is a bottom view of the cylinder head of the engine shown in FIG. 2.

In FIGS. 2 and 3 reference numeral 16 denotes an intake manifold and reference numeral 17 denotes a cylinder head in which the cylinders C are formed. The downstream end portion of each intake passage 5 is formed by the intake manifold 16 and the cylinder head 17. The downstream end portion of the intake passage 5 is bifurcated into a primary intake passage 5a and a secondary intake passage 5b by a partition wall 18 extending from the cylinder head 17 into the intake manifold 16. In the secondary intake passage 5b is provided a swirl control valve 19. The swirl control valve 19 is basically driven by an actuator (not shown) according to increase and reduction in the amount of intake air, and is closed during light load operation of the engine 1 and opened during heavy load operation. This arrangement constitutes the aforementioned swirl controlling device 15.

The primary intake passage 5a has a relatively small cross-sectional area and opens slightly upstream of the intake valve 3 as a swirl port 11a directed in the circumferential direction of the cylinder C (FIG. 3), thereby increasing the flow speed of intake air and reducing the angle at which the intake air is introduced into the combustion chamber with respect to the top face of a piston 20 so that the intake air is given a swirling motion in the circumferential direction of the cylinder C as shown by the arrow K in FIG. 3.

The secondary intake passage 5b is directed substantially in parallel to the central axis of the cylinder C toward the top face of the piston 20 to give the intake air little swirling motion.

When the swirl control valve 19 is closed (the opening degree is 0°), the intake air is introduced into the combustion chamber 2 only through the primary intake passage 5a and accordingly the intake air is given a large or strong swirling motion. As the swirl control valve 19 is opened or as the opening degree of the swirl control valve 19 is increased, the ratio of the amount of intake air introduced through the secondary intake passage 5b to that of intake air introduced through the primary intake passage 5a is increased, and therefore the swirling motion of the overall intake air in the combustion chamber 2 becomes smaller. When the swirl control valve 19 is fully opened (the opening degree is 70°), little swirling motion of the intake air is produced.

Figure 4:
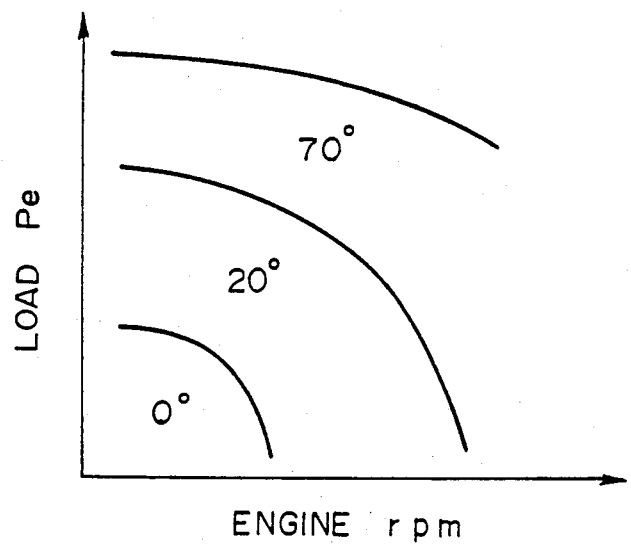
FIG. 4 is a view for illustrating the opening degree characteristics of the swirl control valve employed in the engine shown in FIG. 1.

The swirl control valve 19 is opened and closed by an actuator (not shown) which may comprise, for instance, a diaphragm driven in response to intake vacuum or exhaust pressure. The opening degree of the swirl control valve 19 is controlled corresponding to change in the amount of intake air, i.e. change in the engine rpm and the engine load. In this particular embodiment, as shown in FIG. 4, the opening degree of the swirl control valve 19 is set at 0° (fully closed) in the low-load low-speed range so that a large swirling motion is given to the intake air, at 70° in the high-load high-speed range to suppress production of the swirling motion, and at 20° in the middle-load middle-speed range to produce a relatively small or weak swirling motion.

Further, by opening the swirl control valve 19 when the amount of intake air is increased, reduction in the volumetric efficiency due to resistance of the swirl control valve 19 to the intake air can be limited.

Said fuel injection valve 12 is provided in the intake passage 5 downstream of the swirl control valve 19 to inject fuel toward the combustion chamber 2 from a position relatively near the intake port 11 so that the fuel injected from the fuel injection valve 12 is directly introduced into the combustion chamber 2 through the intake port 11.

The fuel injection timing and the fuel injection amount by the fuel injection valve 12 are controlled by a fuel injection pulse to be delivered to the fuel injection valve 12 from a control device 22 as shown in FIG. 1. Said swirl controlling device 15 further comprises a swirl suppressing means 23 which positively opens the swirl control valve 19 independently from the control based on the characteristics shown in FIG. 4. The swirl suppressing means 23 is actuated under the control of the control device 22.

The control device 22 comprises an interface 24, a CPU 25 and a memory 26. In the memory 26, an operational program for the CPU 25 shown in FIG. 7 and the like are stored. To the control device 22 are input an intake-air-amount signal from the airflow meter 10, an engine-coolant-temperature signal from a coolant temperature sensor 27 for detecting the temperature of engine coolant, a throttle-opening-degree signal from a throttle position sensor 28 for detecting the accelerating condition through change in the opening degree of the throttle valve 8, a swirl-control-valve-opening-degree signal from a swirl-control-valve-position sensor 29 for detecting the opening degree of the swirl control valve 19 and a crankshaft-position signal from a crankshaft sensor 30 for detecting the crankshaft angle of the engine 1 and the top dead center (TDC) of the first cylinder through the angular position of the distributor. Reference numeral 31 denotes an ignition switch.

The CPU 25 of the control device 22 determines a fundamental fuel injection amount according to the engine rpm and the amount of intake air, and corrects the fundamental fuel injection amount to increase the amount to be actually injected when the engine 1 is cold, or when the engine 1 is accelerated, for instance. When the engine load is low, the CPU 25 controls the fuel injection valve 12 to effect the stratified charge. That is, the CPU 25 determines the amount of fuel to be injected for one power stroke and the fuel injection valve timing suitable for effecting the stratified charge, and delivers a fuel injection pulse according to the determination. More particularly, when the engine load is low, the CPU 25 controls the fuel injection valve 12 so that fuel is injected by an amount required for one power stroke a predetermined time after the intake valve 3 is opened and before the intake valve 3 is closed. Further, when the engine is cold, the CPU 25 controls the swirl suppressing means 23 to positively open the swirl control valve 19, thereby suppressing production of the swirling motion of the intake air in the combustion chamber 2, and at the same time advances the fuel injection timing so that the fuel injection at least starts before the intake valve 3 is opened.

Figure 5:
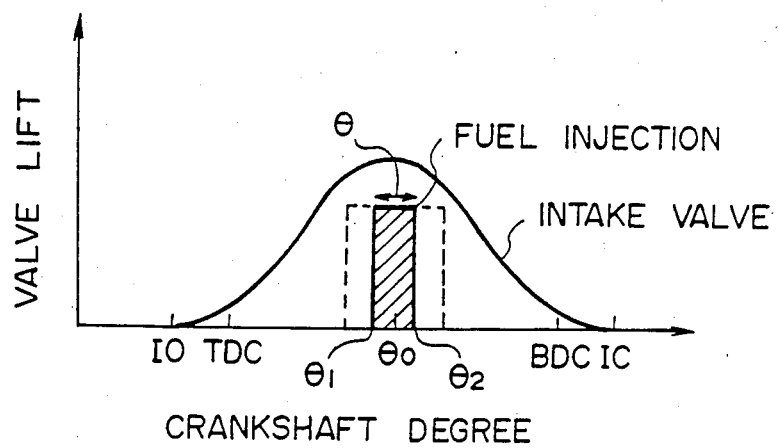
FIG. 5 is a timing chart for illustrating the fuel injection timing when the stratified charge is to be effected.

As shown in FIG. 5, which shows the valve opening timing curve of the intake valve 3, the fuel injection timing is set, in order to effect the stratified charge, so that the middle $\theta 0$ of the fuel injection time is near the time at which the piston speed becomes maximum and which is substantially midway between the time IO when the intake valve 3 begins to open before the top dead center TDC and th time IC when the intake valve 3 is closed after the bottom dead center BDC. Thus, the fuel injection is started before the time at which the piston speed becomes maximum by a crankshaft angle corresponding to a half width of the fuel injection pulse, and is terminated after the time at which the piston speed becomes maximum by the same crankshaft angle. In FIG. 5, $\theta 1$ denotes the fuel injection starting timing and $\theta 2$ denotes the fuel injection terminating timing. As the engine load increases and the fuel injection pulse width is increased, the fuel injection starting timing $\theta 1$ is advanced and the fuel injection terminating timing $\theta 2$ is retarded, both by the same crankshaft angle.

Thus fuel is introduced into the combustion chamber 2 relatively late in the intake stroke while the intake valve 3 is open, and is held in the upper portion of the combustion chamber 2 by virtue of the swirling motion given to the intake air as described above, thereby effecting the stratified charge. From the point of positively effecting the stratified charge, it is preferred that the fuel be injected immediately before the intake valve 3 is closed late in the intake stroke. However, this is disadvantageous from the point of combustion in the combustion chamber 2 in that the fuel is introduced into the combustion chamber 2 in an insufficiently vaporized and atomized state. That is, provided that a good stratification of the air-fuel mixture is maintained by virtue of the swirling motion of the mixture, it is preferred that the fuel injection terminating timing be advanced toward the middle of the intake stroke at which the piston speed is maximum in order to promote atomization of fuel, thereby improving combustion in the combustion chamber 2.

When the engine 1 is cold, the CPU 25 advances the fuel injection starting timing 81 so that the fuel injection is started immediately after the intake valve 3 is closed upon completion of the preceding intake stroke as shown in FIG. 6A. In this case, the fuel injection starting timing $\theta 1$ is first determined and the fuel injection terminating timing $\theta 2$ $\theta 1$ and the fuel injection pulse width. Accordingly, when the engine 1 is cold, fuel injection is completed before the time IO when the intake valve 3 begins to open, and the injected fuel is already in contact with the wall of the engine 1, whereby vaporization and atomization of the fuel are promoted. When a large or strong swirling motion is produced in this state, fuel introduced into the combustion chamber 2 earlier is apt to be urged to stay in the lower portion of the combustion chamber 2, thereby reversing the stratification. Therefore, the CPU 25 actuates the swirl suppressing means 23 to open the swirl control valve 19 to suppress production of the swirl in the combustion chamber 2 so that fuel is uniformly distributed in the combustion chamber 2 when the engine 1 is cold. Since the fuel injection amount is increased when the engine 1 is cold, the air-fuel mixture can be reliably ignited even if it is uniformly distributed in the combustion chamber 2.

When the engine 1 is cold, instead of setting the fuel injection starting timing so that the fuel injection is completed before the intake valve 3 is opened, it may be set so that the fuel injection is started before the intake valve 3 is opened and is terminated after the intake valve is opened, as shown in FIG. 6B.

FIG. 7 is a flow chart for illustrating the operation of the CPU 25 of the control device 22.

When the engine 1 is started, the CPU 25 reads signals from the crankshaft sensor 30, the airflow meter 10, the coolant temperature sensor 27, the throttle position sensor 28 and the swirl-control-valve-position sensor 29 and stores the values of the signals in registers T, A, W1, V and K, respectively (steps S1 to S5). Then the CPU 25 determines whether or not the engine 1 is being started in step S6. When it is determined that the engine 1 is being started, the CPU 25 proceeds to step S7 and stores a predetermined starting fuel injection amount $\beta$ in a register I. In step S8, the CPU 25 produces a starting injection pulse according to the value of the register I and delivers the starting injection pulse to one of the fuel injection valves 12 which is determined by way of a TDC signal of the first cylinder. Thereafter, the CPU 25 returns to the step S1. Upon starting of the engine, as the fuel injection amount cannot be determined on the basis of the amount of intake air, a starting injection pulse having a predetermined width is generated.

After the engine 1 is started, the CPU 25 proceeds to step S9. In the step S9 the CPU 25 calculates the engine rpm from the crankshaft angle stored in the register T and stores it in a register R. Then, in step S10, the CPU 25 calculates a fundamental fuel injection amount on the basis of the engine rpm stored in the register R and the amount of intake air stored in the register A, and stores it in the register I. In step S11, the CPU 25 calculates the acceleration dV/dt based on the contents of the register V, and determines whether or not the acceleration dV/dt is larger than a preset value, $\alpha$, thereby determining whether or not the vehicle is being accelerated. When it is determined that the vehicle is being accelerated, the CPU 25 proceeds to step S12 and stores a preset value $\beta 1$ in a register C2. Otherwise, the CPU 25 proceeds to step S13 and nullifies the value of the register C2. Said preset value $\beta 1$ may be a fixed value or may be changed according to the extent of the acceleration. In the next step S14, the CPU 25 compares the engine coolant temperature stored in the register W1 with a preset value W0, e.g. 60° C., and when the engine coolant temperature is lower than the preset value W0, the CPU 25 multiplies the difference therebetween (W0−W1) by a correction coefficient C1 to obtain a temperature correction amount, and adds the temperature correction amount thus obtained and the value in the register C2 as the acceleration correction amount to the fundamental fuel injection amount stored in the register I, thereby obtaining an actual fuel injection amount. Thereafter, the actual fuel injection amount, i.e. I+C1(W0−W1)+C2, is stored in the register I. Then in step S15, the CPU 25 determines a fuel injection crankshaft angle $\theta$ on the basis of the actual fuel injection amount stored in the register I and stores it in a register $\theta$.

In step S16, the CPU 25 compares the engine coolant temperature stored in the register W1 with the preset value W0 to determine whether or not the engine 1 is cold. When it is determined that warm-up of the engine 1 is completed in the step S16, the fuel injection starting timing 01 is determined in step S17, and thereafter the fuel injection terminating timing $\theta 2$ is determined in step S18 As described above, the fuel injection starting timing $\theta 1$ is determined by subtracting $\theta/2$ ($\theta$ is the actual fuel injection amount stored in the register $\theta$.) from the middle $\theta 0$ (FIG. 5) of the fuel injection time which is set substantially at the middle of the intake stroke, and the fuel injection terminating timing $\theta 2$ is determined by adding $\theta/2$ to the middle $\theta 0$ of the fuel injection time. On the other hand, when it is determined that the engine 1 is cold, the CPU 25 delivers a control signal to the swirl suppressing means 23 to open the swirl control valve 19 by a preset angle, thereby suppressing production of the swirling motion of the intake mixture (step S19). Thereafter, the fuel injection starting timing $\theta 1$ in the cold state of the engine 1 is determined according to a map in step S20, and then the fuel injection terminating timing $\theta 2$ is determined based on the fuel injection starting timing $\theta 1$ and the actual fuel injection amount 0 stored in the register $\theta$ (temperature-corrected) in step S21.

Regardless of whether the engine 1 is cold or warm-up of the engine 1 has been completed, the CPU 25 stays in step S22 until the fuel injection starting timing $\theta 1$ is determined in the step S17 or S20. At the fuel injection timing $\theta 1$, the CPU 25 delivers a "1" signal to the fuel injection valve 12 in step S23, and stays in step S24 until the fuel injection terminating timing $\theta 2$. When the fuel terminating timing $\theta 2$ comes, the CPU 25 terminates output of the "1" signal in step S25 and then returns to the step S1.

Thus, in the internal combustion engine 1 of this embodiment, the fundamental fuel injection amount is determined according to the engine rpm and the amount of intake air, and the actual fuel injection amount is determined by correcting increasing the fundamental fuel injection amount when the engine 1 is cold and/or being accelerated. Then the fuel injection starting timing and the fuel injection terminating timing are determined according to the actual fuel injection amount and in different manners according to whether or not the engine 1 is cold. That is, when the engine 1 is cold, the fuel injection timing is corrected to be advanced so that fuel injection is started before the intake valve 3 is opened, thereby promoting vaporization and atomization of fuel to improve combustion. On the other hand, when warm-up of the engine 1 is completed, a good stratification of the air-fuel mixture is ensured and the fuel economy and the combustion efficiency can be improved.

Though in the above embodiment, the amount of fuel to be injected is controlled according to the engine speed and the amount of intake air by changing the fuel injection period, the amount of fuel to be injected may be controlled by changing both the fuel injection period and the fuel pressure imparted to the fuel injection valve.

Figure 8:
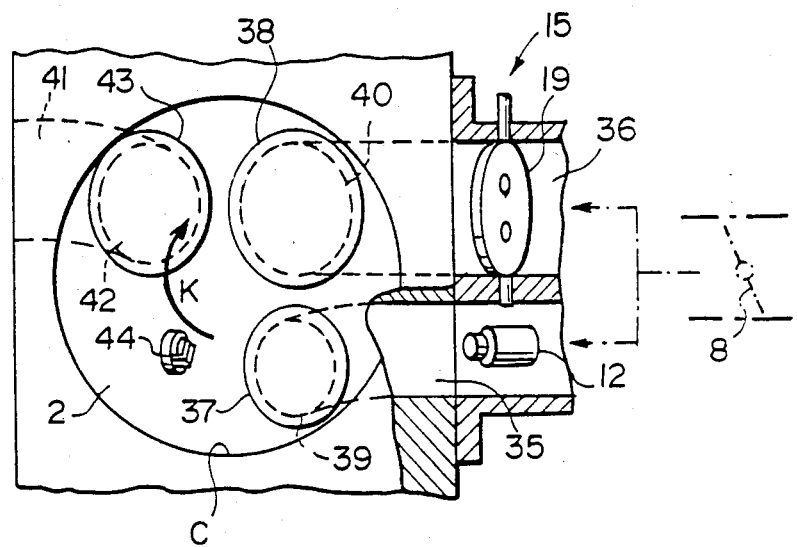
FIG. 8 is a fragmentary cross-sectional view for illustrating a modification of the engine shown in FIG. 1.

FIG. 8 shows a modification of the intake passage arrangement. In the modification shown in FIG. 8, a primary intake passage 35 and a secondary intake passage 36 discretely open in the combustion chamber 2. That is, the primary intake passage 35 is communicated with a primary intake port 39 which is opened and closed by a primary intake valve 37, and the secondary intake passage 36 is communicated with a secondary intake port 40 which is opened and closed by a secondary intake valve 38. Reference numerals 41, 43 and 44 in FIG. 8 respectively denote an exhaust passage communicated with an exhaust port 42, an exhaust valve and a spark plug. The downstream end portion of the primary intake passage 35 is curved so that intake air passing therethrough is introduced into the combustion chamber 2 in a tangential direction of the cylinder C to produce swirling motion in the circumferential direction of the cylinder C, and the upstream end portion of the primary intake passage 35 merges into the secondary intake passage 36 downstream of the throttle valve 8. In the secondary intake passage 36, is provided the swirl control valve 19 which is connected to the actuator and the swirl suppressing means for controlling the swirling motion of intake air.

When the swirl control valve 19 is fully closed, intake air is introduced into the combustion chamber 2 solely through the primary intake passage 35, thereby producing a large or strong swirling motion. When the swirl control valve 19 is opened, intake air is introduced into the combustion chamber 2 also through the secondary intake passage 36, and as the amount of intake air passing through the primary intake passage 35 is reduced, the swirl produced in the combustion chamber 2 is gradually weakened.

In the primary intake passage 35, is disposed a fuel injection valve 12 which is adapted to inject fuel toward the spark plug 44 in the combustion chamber 2 when the primary intake valve 37 is opened. The fuel injection amount and the fuel injection timing of the fuel injection valve 12 and open and closure of the swirl control valve 19 are controlled by a control device similar to the control device 22 described above so that, at least at low load, a large swirling motion is given to the intake air and at the same time fuel is injected at substantially the middle of the opening time of the primary intake valve 37 in order to effect the stratified charge, while when the engine is cold, fuel injection is started before the primary intake valve 37 is opened and production of swirling motion is suppressed thereby promoting vaporization and atomization of fuel.

Though in the swirl controlling device 15 described above, the swirl is controlled by changing the ratio of the amount of intake air flowing through the primary intake passage 5a or 35 to that flowing through the secondary intake passage 5b or 36 by controlling the swirl control valve 19, other various known swirl controlling device may be used instead. For example, a swirl controlling device in which the intake passage comprises a single passage and a swirl control plate is mounted for rotation in the downstream end portion of the single passage so that the effective cross-sectional area of the intake passage is changed by rotating the swirl control plate and intake air can be introduced into the combustion chamber in a tangential direction thereof.

Further, although the swirling motion of intake air is changed stepwise in the above embodiment, it may be continuously changed with change in the operating condition.

In the above embodiment, when the engine is not cold, fuel is injected in the intake stroke irrespective of the load on the engine. However, since the air-fuel mixture need not be stratified and is rather preferred to be uniform when the engine load is high, the fuel injection timing may be advanced simultaneously with suppression of the swirl when the engine load is high.

We claim:

1. A fuel-injected internal combustion engine comprising:
    a fuel injection valve disposed in an intake passage which communicates with a combustion chamber by way of an intake valve;
    a spark generating means disposed at an upper portion of the combustion chamber above a piston;
    a swirl controlling device for controlling a swirling motion to be given to intake air in the circumferential direction of the cylinder forming the combustion chamber;

a control device which, at least at low load, controls the fuel injection valve to inject fuel by an amount required for one power stroke of a predetermined time after the intake valve is opened and during the intake stroke, and controls the swirl controlling device to give intake air a swirling motion in the circumferential direction of the cylinder forming the combustion chamber so as to depress a disturbance of the intake air in the moving direction of the piston and to stratify the fuel introduced into the combustion chamber in the latter half of the intake stroke in the vicinity of the spark generating means;

and a correction means for overriding said control device when the engine is cold for controlling the fuel injection valve to start fuel injection before the intake valve is opened and for controlling the swirl controlling device to suppress production of swirling motion of intake air;

said correction means, when the engine is cold, overriding said control device and setting a fuel injection timing such that the major part of the fuel to be injected is injected during the time when the intake valve is closed and controls the swirl control device to suppress production of swirling motion of intake air regardless of the engine load.

2. A fuel-injected internal combustion engine as defined in claim 1 in which said correction means controls the fuel injection valve to start and terminate fuel injection before the intake valve is opened.

3. A fuel-injected internal combustion engine as defined in claim 1 in which said correction means controls the fuel injection valve to start fuel injection immediately after the intake valve is closed in the preceding intake stroke.

4. A fuel-injected internal combustion engine as defined in claim 1 in which said correction means controls the fuel injection valve to start fuel injection before the intake valve is opened and terminate it in the first half of the intake stroke after the intake valve is opened.

5. A fuel-injected internal combustion engine as defined in claim 1 in which said swirl controlling device is controlled to suppress production of swirling motion of intake air at high-load high-speed operation of the engine.

6. A fuel-injected internal combustion engine comprising an intake passage communicated with a combustion chamber by way of an intake valve, a fuel-injection valve provided to inject fuel into the intake passage near the combustion chamber, a spark generating means disposed at an upper portion of the combustion chamber above a piston, a swirl controlling device for controlling a swirling motion to be given to intake air in the circumferential direction of the cylinder forming the combustion chamber, the swirl controlling device taking at least a first position in which intake air is given a strong swirling motion in the circumferential direction of the cylinder and a second position in which production of swirling motion of intake air is suppressed, a control device which, at least at low load, controls the fuel injection valve to inject fuel by an amount required for one power stroke a predetermined time after the intake valve is opened and during the intake stroke and controls the swirl controlling device to take the first position so as to depress a disturbance of the intake air in the moving direction of the piston and to stratify the fuel introduced into the combustion chamber in the latter half of the intake stroke in the vicinity of the spark generating means, and a correction means which, when the engine is cold and the engine load is low, controls the fuel injection valve to start fuel injection before the intake valve is opened and controls the swirl controlling device to take the second position.

7. A fuel-injected internal combustion engine as defined in claim 6 in which said correction means controls the fuel injection valve to start and terminate fuel injection before the intake valve is opened.

8. A fuel-injected internal combustion engine as defined in claim 7 in which said correction means controls the fuel injection valve to start fuel injection immediately after the intake valve is closed in the preceding intake stroke.

9. A fuel-injected internal combustion engine as defined in claim 6 in which said correction means controls the fuel injection valve to start fuel injection before the intake valve is opened and terminate it in the first half of the intake stroke after the intake valve is opened.

10. A fuel-injected internal combustion engine as defined in claim 6 in which said swirl controlling device is controlled to take said second position at high-load high-speed operation of the engine.

11. A fuel-injected internal combustion engine as defined in claim 10 in which said intake passage is communicated with the combustion chamber by way of a single intake port which is opened and closed by the intake valve and comprises a secondary intake passage and a primary intake passage which is positioned below the secondary intake passage and is adapted to introduce intake air into the combustion chamber substantially in a horizontal direction, and said swirl controlling device comprises a control valve provided in the secondary intake passage to control flow of intake air passing through the secondary intake passage.

* * * * *